US011111610B2

(12) United States Patent
Aitharaju et al.

(10) Patent No.: US 11,111,610 B2
(45) Date of Patent: Sep. 7, 2021

(54) METHODS FOR FORMING COMPOSITE ARTICLES FROM NON-CRIMP FABRICS

(71) Applicant: GM GLOBAL TECHNOLOGY OPERATIONS LLC, Detroit, MI (US)

(72) Inventors: Venkateshwar R. Aitharaju, Troy, MI (US); William R. Rodgers, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 222 days.

(21) Appl. No.: 16/018,434

(22) Filed: Jun. 26, 2018

(65) Prior Publication Data
US 2019/0390379 A1    Dec. 26, 2019

(51) Int. Cl.
| | |
|---|---|
| *D04B 21/16* | (2006.01) |
| *D04H 3/004* | (2012.01) |
| *D04H 3/147* | (2012.01) |
| *B29C 70/20* | (2006.01) |
| *B29C 70/52* | (2006.01) |

(Continued)

(52) U.S. Cl.
CPC .......... *D04B 21/165* (2013.01); *B29C 70/205* (2013.01); *B29C 70/528* (2013.01); *D04H 3/004* (2013.01); *D04H 3/04* (2013.01); *D04H 3/147* (2013.01); *B29K 2105/0809* (2013.01); *D10B 2401/063* (2013.01)

(58) Field of Classification Search
USPC ........................................................ 264/258
See application file for complete search history.

(56) References Cited

U.S. PATENT DOCUMENTS

| | | | | |
|---|---|---|---|---|
| 4,875,379 A | * | 10/1989 | Rohs | ....................... G01L 3/109 73/862.326 |
| 5,651,848 A | * | 7/1997 | Cohee | ....................... A42B 3/06 156/93 |

(Continued)

FOREIGN PATENT DOCUMENTS

| | | |
|---|---|---|
| CN | 1468279 A | 1/2004 |
| CN | 105682913 A | 6/2016 |

(Continued)

OTHER PUBLICATIONS

Saertex, Datenblatt; Sep. 8, 2009, 1 page.

*Primary Examiner* — Brian K Talbot
(74) *Attorney, Agent, or Firm* — Quinn IP Law (57) ABSTRACT

Methods for forming composite articles include providing a non-crimp fabric (NCF) comprising a plurality of fiber plies maintained in a layup by stitching, wherein the stitching exhibits a lower structural tolerance to heat and/or UV light relative to the fiber plies, selectively degrading the stitching in one or more areas using heat or UV light, draping the NCF on a contoured article, applying a polymer matrix material to the draped NCF, and curing the polymer matrix material to form a contoured composite article. The stitching can be degraded in regions of the NCF which, when draped on the contoured article, correspond to topological features of the contoured article. Degrading the stitching can comprise breaking the stitching. The fiber plies can comprise carbon fibers, glass fibers, and/or basalt fibers. The contoured article can be tooling and/or an automotive component. The NCF can be a bi-axial NCF.

20 Claims, 4 Drawing Sheets

(51) Int. Cl.
*D04H 3/04* (2012.01)
*B29K 105/08* (2006.01)

(56) References Cited

U.S. PATENT DOCUMENTS

| | | | | |
|---|---|---|---|---|
| 6,890,476 | B2* | 5/2005 | Wagener | B29C 70/202 |
| | | | | 264/240 |
| 7,794,640 | B2* | 9/2010 | Healey | D04H 3/002 |
| | | | | 264/258 |
| 7,942,993 | B2* | 5/2011 | Gessler | B29C 70/202 |
| | | | | 156/148 |
| 8,613,257 | B2* | 12/2013 | Wockatz | D04H 3/04 |
| | | | | 112/440 |
| 9,371,604 | B2* | 6/2016 | Wockatz | B32B 5/12 |
| 2005/0181690 | A1* | 8/2005 | Pedigo, Jr. | D04B 1/14 |
| | | | | 442/59 |
| 2011/0171452 | A1* | 7/2011 | Ottinger | D04H 13/00 |
| | | | | 428/221 |
| 2014/0335750 | A1* | 11/2014 | Adams | B32B 5/028 |
| | | | | 442/57 |
| 2015/0030804 | A1* | 1/2015 | Baser | B32B 27/34 |
| | | | | 428/109 |
| 2018/0236733 | A1* | 8/2018 | Hollander | D04H 3/12 |
| 2018/0281343 | A1* | 10/2018 | Harada | B32B 5/026 |

FOREIGN PATENT DOCUMENTS

| | | |
|---|---|---|
| DE | 19925588 A1 | 12/2000 |
| DE | 60124140 T2 | 9/2007 |
| GB | 2563869 A | 1/2019 |

* cited by examiner

METHODS FOR FORMING COMPOSITE ARTICLES FROM NON-CRIMP FABRICS

BACKGROUND

There is increasing interest in substituting high performance lightweight reinforced composite components and structures comprising a polymer matrix with a suitable reinforcement for metallic components in vehicles. Suitable polymers are often thermosets, such as epoxies, vinyl-esters or polyesters, or thermoplastics, such as polypropylene or poly amide, and suitable reinforcements include structural fibers such as carbon, glass or aramid fibers. Such fibers may be randomly oriented and arranged or aligned along one or more preferred directions.

For fabric applications, aligned fibers may be assembled into one of two fabric structures for ease of application: a woven cloth or a non-woven fabric often called a non-crimp or stitch bonded fabric. A woven cloth employs tows of a first orientation which alternately overlie and underlie fiber tows of a second orientation, usually at about 90° to the first orientation. The weave may be tight, with adjacent tows positioned about a millimeter or less apart, or loose, with adjacent tows spaced up to about 10 millimeters apart.

A non-crimp fabric includes a number of spaced apart fiber rovings may be simply laid alongside one another in a ply, and secured and locked into place, by stitching, using, for example, a polyester yarn. Such stitching generally extends over the length and breadth of the reinforcement ply and is usually accomplished with a stitch beam which incorporates a plurality of needles and has a suitable motion to enable both simple chain stitches and other more complex stitches, for example tricot stitches. In many cases multiple coextensive plies are laid atop one another and the rovings of all of the plies are secured in a single stitching operation. Often the plies are placed with the fiber orientations of adjacent plies rotated one from another to render the in-plane properties less directional, or more isotropic, in the multi-ply reinforcement than in each ply individually. The weight of each ply is determined by the bulk of the roving and the spacing between adjacent roving bundles. These, non-woven reinforcements are called stitch bonded fabrics or non crimp fabrics, often abbreviated as NCF.

Such fabric reinforcements, woven or non-woven, may be impregnated with a suitable polymer resin, placed in a mold, shaped and then cured, typically at modestly elevated temperature (e.g., 150° C.) to form the desired polymer composite. It will be appreciated that the above-listed sequence of operations may be modified for different molding processes. For example, the fabric may be placed in the tooling (i.e., a mold) with resin already impregnated, or the resin can be added after the fabric is in the mold via resin infusion, resin transfer molding, or structural resin injection molding. Thermoplastic or thermoset sheets or materials with comingled strands of thermoplastic and reinforcing fiber may also be employed.

SUMMARY OF THE INVENTION

Methods for forming a composite article are provided, and include providing a non-crimp fabric (NCF). The NCF includes a plurality of fiber plies maintained in a layup by stitching, and the stitching exhibits a lower structural tolerance to heat and/or UV light relative to the fiber plies. The method next includes selectively degrading the stitching in one or more areas using heat or UV light, draping the NCF on a contoured article, applying a polymer matrix material to the draped NCF, and curing the polymer matrix material to form a contoured composite article. The stitching can be degraded in regions of the NCF which, when draped on the contoured article, correspond to topological features of the contoured article. The stitching can be degraded in regions of the NCF which, when draped on the contoured article, correspond to features thereof that exhibit topological variation in more than one dimension. Degrading the stitching can include breaking the stitching. The fiber plies can include carbon fibers, glass fibers, and/or basalt fibers. The contoured article can be tooling. The contoured article can be an automotive component. The NCF can be a bi-axial NCF.

Other methods for forming a composite article are provided, and include providing a non-crimp fabric (NCF). The NCF can include a plurality of fiber plies maintained in a layup by stitching, and the stitching can exhibit a lower structural tolerance to heat relative to the fiber plies. The method next includes selectively degrading the stitching in one or more areas using heat, draping the NCF on a contoured article, applying a polymer matrix material to the draped NCF, and curing the polymer matrix material to form a contoured composite article. The fiber plies can include carbon fibers, glass fibers, and/or basalt fibers. The stitching can include one or more polyamides, one or more polyesters, polyurethane, one or more rayon materials, polypropylene, one or more polyglycolic acids, one or more polyvinyl alcohols, and combinations thereof. The stitching can be selectively degraded by contacting the NCF with a heated contoured roller or a heated contoured stamp. The contoured roller or contoured stamp can include contoured portions which are heated to at least the melting point of the stitching. The stitching can be selectively degraded by a laser, a rastered induction heating tool, or open-air plasma.

Other methods for forming a composite article are provided, and include providing a non-crimp fabric (NCF). The NCF includes a plurality of fiber plies maintained in a layup by stitching, and the stitching exhibits a lower structural tolerance to UV light relative to the fiber plies. The method next includes selectively degrading the stitching in one or more areas using UV light, draping the NCF on a contoured article, applying a polymer matrix material to the draped NCF, and curing the polymer matrix material to form a contoured composite article. The stitching can be selectively degraded using UV light by applying a mask to the NCF, wherein the mask comprises one or more apertures which correspond to regions of the NCF in which stitching degradation is desired, and exposing the mask to UV light. The stitching can be selectively degraded by a shrouded UV light source. The fiber plies can include carbon fibers, glass fibers, and/or basalt fibers. The stitching can include one or more polyamides, one or more polyesters, polyurethane, one or more rayon materials, polypropylene, one or more polyglycolic acids, one or more polyvinyl alcohols, and combinations thereof.

DETAILED DESCRIPTION

Fiber reinforced polymer composite articles find increasing application where low mass and high strength are required. Often the composite reinforcement is itself a composite of several different, generally coextensive reinforcing fiber layers stacked or layered atop one another. The reinforcements may be aligned woven or non-woven fibers, or randomly arranged and positioned fibers which may be continuous, or chopped. Illustrative examples of such reinforcements are shown in FIGS. 1A-B and may comprise without limitation, carbon fibers, glass fibers, and aramid fibers, among others as described below.

Figure 1A:
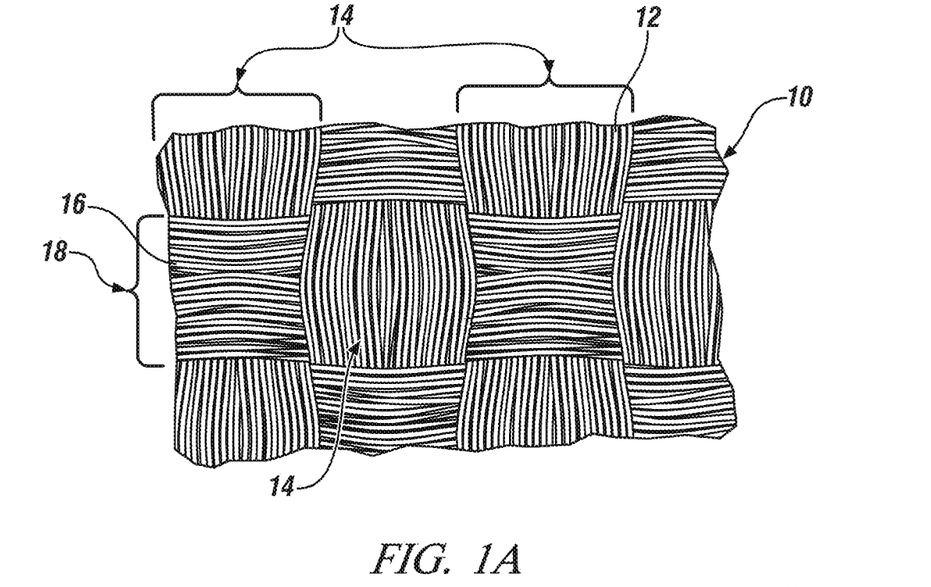
FIG. 1A illustrates a top view of a woven fabric, according to one or more embodiments.
Figure 1B:
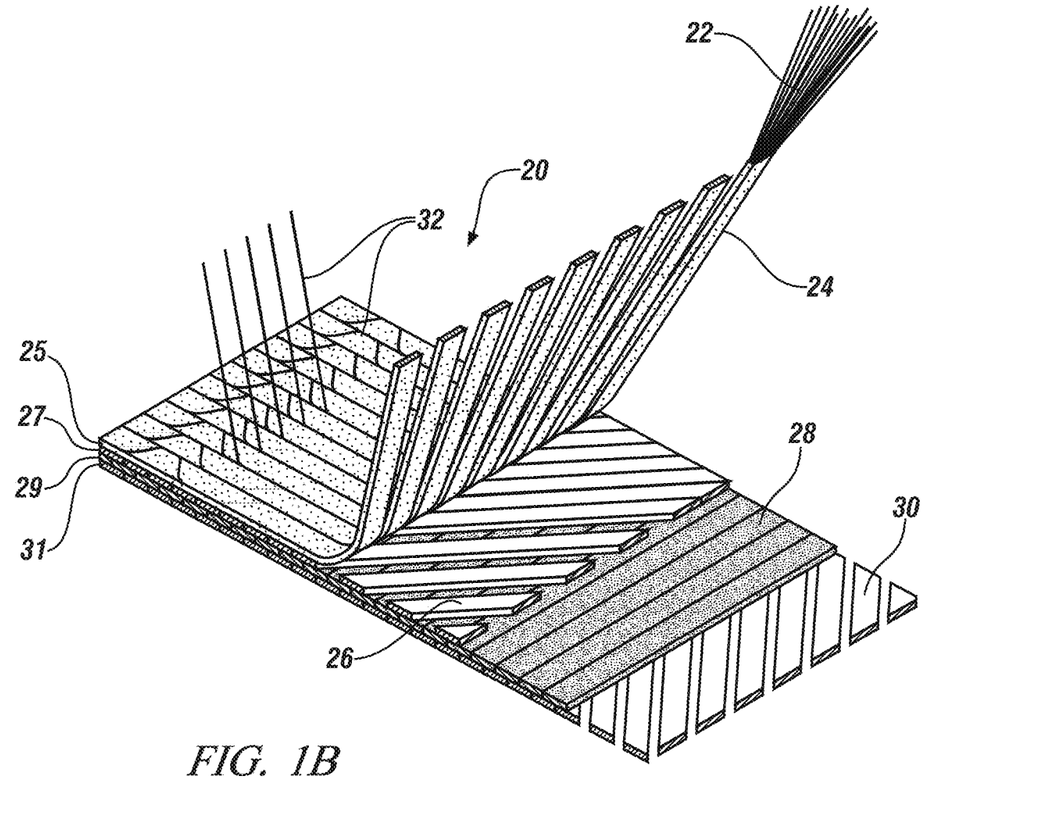
FIG. 1B illustrates a perspective view of a non-crimp fabric, according to one or more embodiments.
Figure 2A:
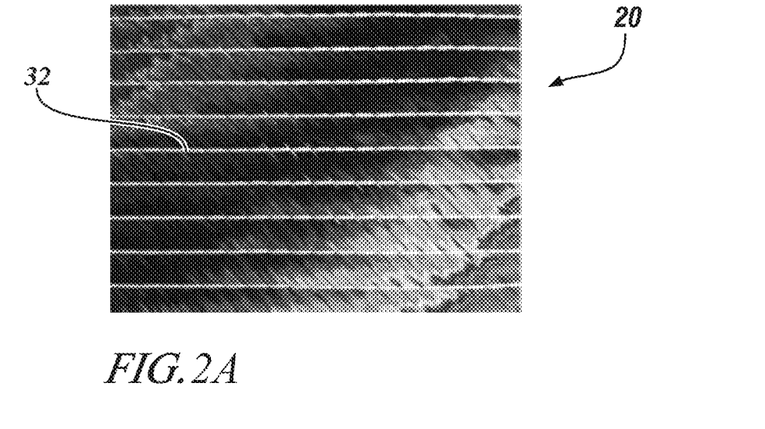
FIG. 2A illustrates a top view of a non-crimp fabric with stitching applied in a chain or pillar pattern, according to one or more embodiments.
Figure 2B:
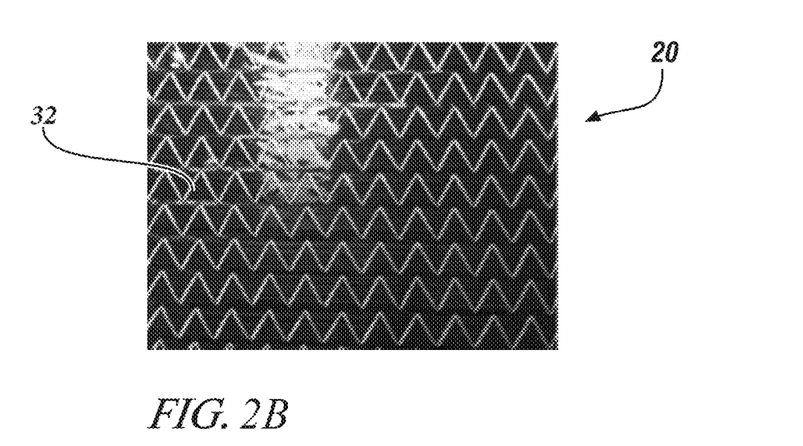
FIG. 2B illustrates a top view of a non-crimp fabric with stitching applied in a tricot pattern, according to one or more embodiments.
Figure 2C:
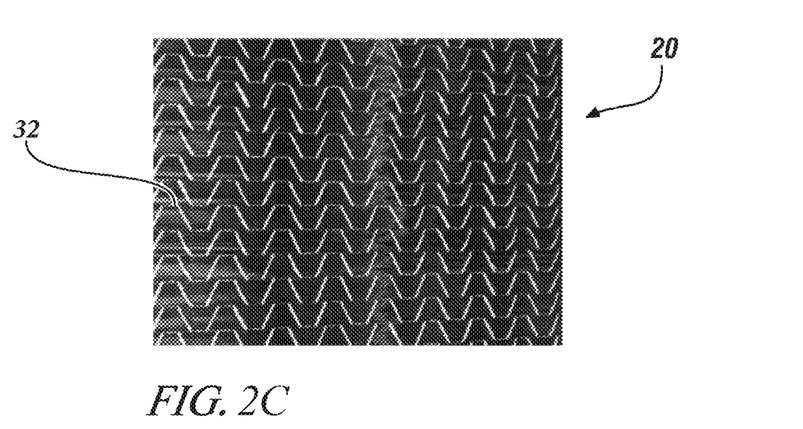
FIG. 2C illustrates a top view of a non-crimp fabric with stitching applied in a hybrid chain/tricot pattern, according to one or more embodiments.

FIG. 1A shows a portion of a woven reinforcement 10 comprising warp fibers 12 arranged into tows 14 which alternately overlie and underlie weft fibers 16 arranged into tow(s) 18. FIG. 1B shows a four layer, or "quad-axial", non-crimp fabric (NCF) 20 in which roving layers, or "plies", 25, 27, 29, 31 containing oriented spaced-apart roving 24, 26, 28, 30, respectively, each containing fibers 22 (shown only once for clarity) are laid down in layered fashion and secured by stitching 32. The stitching 32 illustrated is of a hybrid chain/tricot pattern, but many various stitching patterns may be employed. As non-limiting examples, FIG. 2A illustrates a top view of a NCF 20 with stitching 32 applied in a chain or pillar pattern, FIG. 2B illustrates a top view of a NCF 20 with stitching 32 applied in a tricot pattern, and FIG. 2C illustrates a top view of a NCF 20 with stitching 32 applied in a hybrid chain/tricot pattern.

NCFs are commonly used to form composite articles, which generally include a NCF embedded within a cured polymer matrix. To form a composite article, a NCF is first draped on a contoured article to establish the desired end geometry of the composite article, and a polymer matrix material is subsequently applied to the NCF and cured. Provided herein are methods for forming composite articles comprising NCFs which improve the drapability of NCFs during formation and consequently reduce undesired wrinkles and defects in the composite articles.

Figure 3:
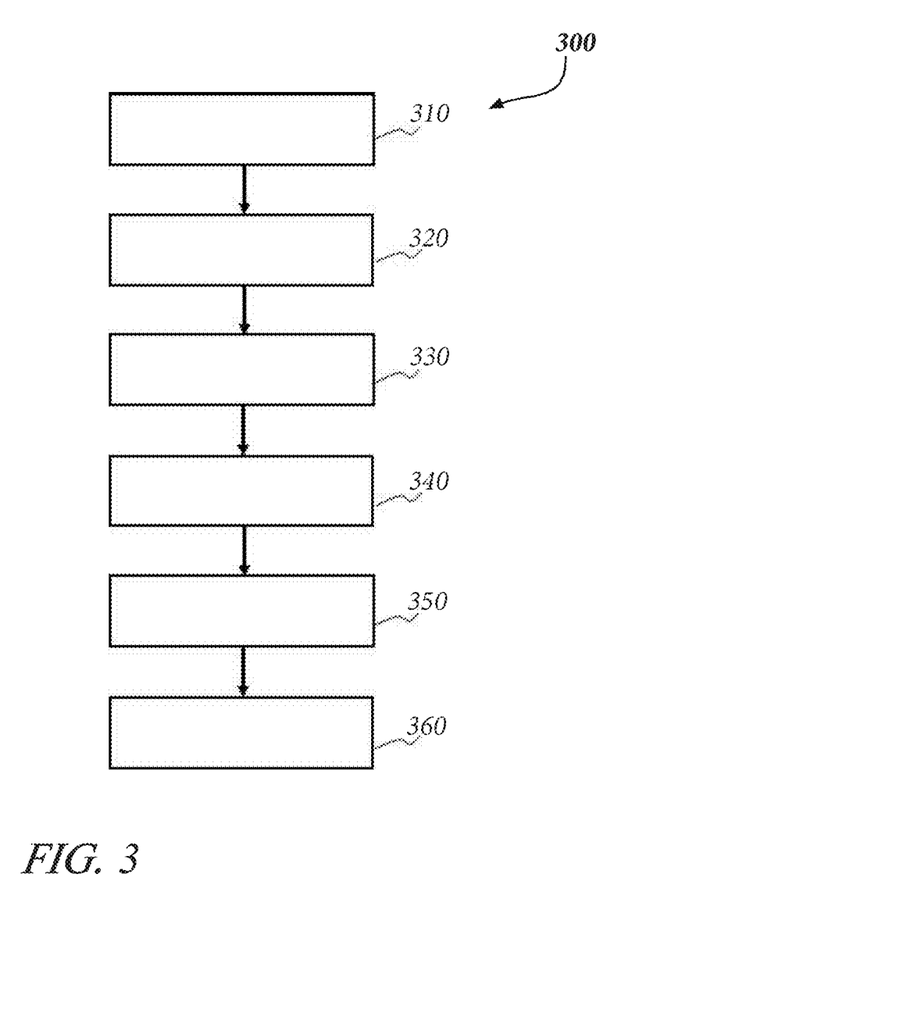
FIG. 3 illustrates a block diagram of a method for forming a composite article, according to one or more embodiments.

FIG. 3 illustrates a block diagram of a method 300 for forming a composite article. Method 300 will be described in relation to the NCF 20 of FIG. 2B, but one of skill in the art will understand that the method 300 is not to be limited thereby. Method 300 comprises providing 310 a NCF 20, selectively degrading 320 the stitching 32 in one or more areas, draping 330 the NCF 20 on a contoured article, applying 340 a polymer matrix material to the draped NCF 20, and curing 350 the polymer matrix material to form a contoured composite article. The method can further optionally comprise separating 360 the contoured article from the contoured composite article.

NCFs 20 can include poly-axial NCFs (e.g., bi-axial, tri-axial, quad-axial NCFs) which comprise a plurality of plies. One common example of a bi-axial NCF is a 2-ply grouping of fibers arranged at +45° and −45°. Other bi-axial NCFs include groupings of fibers arranged at 0° and 90°, groupings of fibers arranged at +30° and −30°, groupings of fibers arranged at +60° and −60°, and groupings of fibers arranged at non-symmetric angles such as 0° and +45°. A common example of a tri-axial NCF is a 3-ply grouping of fibers arranged at 0°, +60° and −60°. A common example of a quad-axial NCF is a 4-ply grouping of fibers arranged at 0°, +45°, −45°, and 90°. It will be appreciated that variations in the number of plies, in the number of orientations, in the angular alignment of the fibers within any ply and in the fiber density in each orientation are comprehended by the terminology non-crimp fabric, stitch bonded fabric, NCF, NCF fabric or aligned fiber layer as used in this specification.

The fibers 22 of a NCF 20 can include carbon fibers, glass fibers (e.g., fiber glass, quartz), basalt fibers, aramid fibers, polyphenylene benzobisoxazole (PBO) fibers, polyethylene fibers (e.g., ultra-high molecular weight polyethylene (UHMWPE)), polypropylene fibers (e.g., high-strength polypropylene), natural fibers (e.g., cotton, flax, cellulose, spider silk), and combinations thereof, for example.

The polymer matrix can include any suitable thermoplastic resin or thermoset resin. The thermoplastic resin may include: vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyamide resin (PA6, PA11, PA12, PA46, PA66, PA610), fully or partially aromatic polyamide resins, polyacetal resin, polycarbonate resin, polyethylene terephthalate resin, polyethylene naphthalate resin, polybutylene terephthalate resin, polyacrylate resin, polyphenylene ether resin, polyphenylene sulfide resin, polysulfone resin, polyether sulfone resin, polyether ether ketone resin, polylactide resin, or any combination or copolymer of these resins. The thermoset resin may include: benzoxazine, a bis-maleimide (BMI), a cyanate ester, an epoxy, a phenolic (PF), a polyacrylate (acrylic), a polyimide (PI), an unsaturated polyester, a polyurethane (PUR), a vinyl ester, a siloxane, or any combination or copolymer of these resins.

Method 300 comprises providing 310 a NCF 20 comprising a plurality of fiber plies maintained in a layup by stitching 32. In some embodiments, the NCF 20 comprises a bi-axial NCF, such as those described above. The stitching 32 exhibits a higher specific vulnerability than the fibers 22 of each ply of the NCF 20. A specific vulnerability can include a structural tolerance to heat, UV light, chemicals, or tensile forces, for example. In one embodiment, the stitching 32 exhibits a lower structural tolerance to heat and/or UV light relative to the fiber plies of the NCF 20. In one embodiment, the stitching 32 exhibits a lower structural tolerance to heat relative to the fiber plies of the NCF 20. In one embodiment, the stitching 32 exhibits a lower structural tolerance to UV light relative to the fiber plies of the NCF 20.

Method 300 subsequently comprises selectively degrading 320 the stitching 32 in one or more areas using methods which exploit the specific vulnerability of the stitching 32. Accordingly, for example, in embodiments where the stitching 32 exhibits a lower structural tolerance to heat and/or UV light relative to the fiber plies of the NCF 20, selectively degrading 320 the stitching 32 can be effected using heat or UV light. Degrading 320 can comprise melting, breaking, or otherwise structurally impairing the stitching 32 to the extent that desired flowability of the immediately proximate NCF fibers is achieved. For example, degrading can comprise decreasing the elasticity of stitching, in some embodiments. In some embodiments, the stitching can exhibit a lower strength than commonly used threads such that the thread suitably breaks under tension. For example, a common polyester stitching for NFCs 20 can have a decitex (mass in grams per 10,000 meters of a filament) of about 33. Accordingly, in some embodiments a NFC 20 can comprise stitching 32 comprising a decitex of about 10-15, for example.

In embodiments where the stitching 32 exhibits a lower structural tolerance to heat relative to the fiber plies of the NCF 20, the stitching 32 can be selectively degrading 320 using heat. Suitable stitching 32 materials include polyamides, polyesters, cotton, silk, polytetrafluoroethylene, viscose rayon, polypropylene, polyacrylate, linen, wool, aramid fiber, alumina silicate, polyglycolic acid, polyvinyl alcohol, and polycarbonate polymers, among others. Stitching materials particularly suited for this embodiment can comprise one or more polyamides, one or more polyesters, polyurethane, one or more rayon materials, polypropylene, one or more polyglycolic acids, one or more polyvinyl alcohols, and combinations thereof.

NCFs in some embodiments ideally comprise fibers with degradation temperatures significantly higher than the degradation temperatures of the stitching materials. Such fiber materials can include one or more of carbon fiber, glass fibers, and basalt fibers, among others described above. In one embodiment, a NCF comprises carbon fibers and polyamide stitching. In one embodiment, a NCF comprises glass fibers and polyamide stitching. In one embodiment, a NCF comprises basalt fibers and polyamide stitching. In one embodiment, a NCF comprises carbon fibers and polyester stitching. In one embodiment, a NCF comprises glass fibers and polyester stitching. In one embodiment, a NCF comprises basalt fibers and polyester stitching. In one embodiment, a NCF comprises carbon fibers and viscose rayon stitching. In one embodiment, a NCF comprises glass fibers and viscose rayon stitching. In one embodiment, a NCF comprises carbon fibers and polypropylene stitching. In one embodiment, a NCF comprises glass fibers and polypropylene stitching. In one embodiment, a NCF comprises carbon fibers and polyurethane stitching. In one embodiment, a NCF comprises glass fibers and polyurethane stitching. In one embodiment, a NCF comprises carbon fibers and polyglycolic acid stitching. In one embodiment, a NCF comprises glass fibers and polyglycolic acid stitching.

In some embodiments, the NCF can be contacted with a heated contoured roller or heated contoured stamp, each of which comprises at least one contoured portion. The roller or stamp contours can protrude from a tubular surface of the roller or a normal surface of the stamp such that they will contact the NCF 20 in areas which stitching degradation is desired. The contoured roller or stamp is heated to a temperature selected to effect a desired degradation of the stitching 32. The stamp or roller may be entirely heated, or the contours may be selectively heated. The temperature to which a roller or stamp is heated prior to contacting the NCF 20 can comprise at least the melting point of the stitching, for example. In other embodiments, the stitching 32 can be selectively degraded by a laser, a rastered induction heating tool, open-air plasma, among other heat sources capable of achieving the desired stitching 32 degradation.

Stitching materials which are specifically vulnerable to laser heating can include polymeric materials such as polyamides, polyesters, and viscose rayon, among others. Stitching which is specifically vulnerable to induction heating can include polymeric stitching comprising small metallic particles (e.g., particles with an average diameter of about 10 nm to about 20 µm). Metallic particles can comprise iron, and/or nickel, for example. Stitching materials which are specifically vulnerable to plasma heating include polymeric materials capable of degrading from exposure to activated oxygen. Some such materials can include polyamides, polyesters, viscose rayon, polyurethane, polyglycolic acid, and polyvinyl alcohol.

Similarly, in embodiments where the stitching 32 exhibits a lower structural tolerance to UV light relative to the fiber plies of the NCF 20, selectively degrading 320 the stitching 32 can be effected using UV light. A UV light source can include any device configured to provide sufficient high energy UV light, such as short wave ultraviolet lamps, gas discharge lamps, and ultraviolet emitting LEDs, among others. In some embodiments, the UV light discharge range would ideally be in the UVC range (e.g., about 100 nm to about 280 nm) such that there is sufficient energy to degrade absorbing polymeric materials. In some embodiments, a shroud with stitching degradation apertures is be applied to the NCF 20, and the shroud is subsequently exposed to UV light such that the UV light only contacts the NCF 20 in areas directly beneath the shroud apertures. Additionally or alternatively, a UV light source can be itself shrouded to focus the emission of UV light in desired directions to effect specific degradation of stitching 32.

Stitching materials which are specifically vulnerable to UV light can include polyamides, polyesters, and polyacrylate, for example. In some embodiments, stitching materials which are specifically vulnerable to UV light can comprise polymeric materials and UV light additives capable of absorbing UV light and degrading to generate small organic free radicals. Without being bound to a particular degradation mechanism, in some embodiments such free radicals can abstract hydrogen atoms from the polymeric stitching materials and degrade the structural integrity thereof. Examples of such UV additives include 2,2-dimethoxy-2-phenylacetophenone, benzilketals (such as benzildimethylketal), hydroxyacetophenone, α-hydroxyalkylphenones, acylphosphine oxides (2,4,6-trimethylolbenzoyldiphenylphosphine oxide), α-aminoalkylphenones, and azobisisobutyronitrile, among others.

Similarly, in embodiments where the stitching materials are specifically vulnerable to particular chemicals (e.g., acids or bases) relative to the fiber plies of the NCF 20, selectively degrading 320 the stitching 32 can be effected using the particular chemicals. For example, stitching comprising polyester, polyamid, polyurethane, polyglycolic acid, and/or polyvinyl alcohol is particularly susceptible to degradation by strong acids (e.g., hydrochloric acid, sulfuric acid, and nitric acid) and strong bases (e.g., potassium hydroxide and sodium hydroxide) which would depolymerize the stitching material.

Subsequent to selectively degrading 320 the stitching 32 method 300 comprises draping 330 the NCF 20 on a contoured article. The contoured article may be tooling, and/or a further aspect of the composite article. For example, the NCF can be draped on an automotive component which will become integral to the contoured composite article after curing 350. In such embodiments, the components are reinforced. In such embodiments, the automotive component would provide at least part of the tooling for forming the composite part. The stitching 32 of the NCF 20 is selectively degraded in regions of the NCF 20 which, when draped on the contoured article, correspond to topological features thereof. In particular, the stitching 32 of the NCF 20 is selectively degraded in regions of the NCF 20 which, when draped on the contoured article, correspond to features thereof that exhibit topological variation in more than one dimension. A corner formed by two planar faces, for example, exhibits a topological variation in only one dimension, relative to one of the planar faces, and causes minimal wrinkling of a NCF 20 when draped thereon. Conversely, a corner formed by three planar faces exhibits a topological variation in 2 dimensions relative to one of the planar faces, and causes a higher degree of wrinkling of a NCF 20 when draped thereon.

Figure 4A:
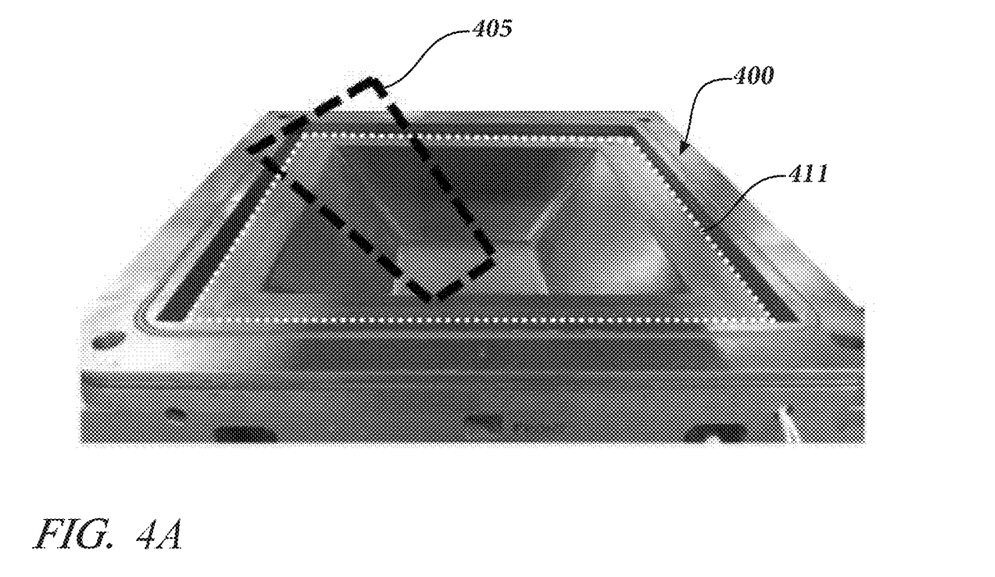
FIG. 4A illustrates a perspective view of tooling that may function as a contoured article, according to one or more embodiments.
Figure 4B:
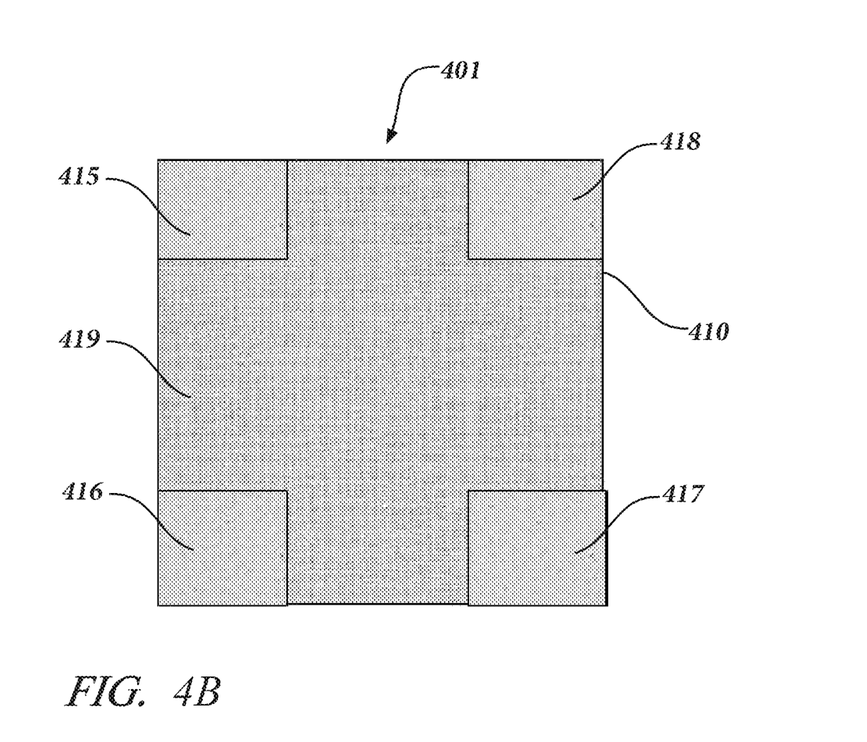
FIG. 4B illustrates a top view of a NCF blank that can be draped over tooling.

FIG. 4A illustrates a perspective view of tooling 400 that may function as a contoured article. FIG. 4B illustrates a top view of a NCF blank 401 that can be draped 330 over tooling 400. The NCF blank 401 can be draped 330 on tooling 400 such that the NCF blank perimeter 410 aligns with position 411 of tooling 400. Area 405 identifies a region of tooling 400 with topological features that detrimentally impact NCF blank 401 draping 330. Accordingly, the stitching 32 of NCF blank 401 can be selectively degraded 320 in regions 415, 416, 417, and 418 to accommodate such topological features of tooling 400. The stitching 32 of region 419 can remain substantially intact, for example. One of skill in the art will comprehend that tooling 400 and NCF blank 401 are provided for the purpose of illustration only, and the methods and articles described herein are not intended to be limited to the geometries thereof.

Subsequent to draping 330 the NCF 20 on a contoured article, a polymer matrix (such as one of the above described polymer matrices) is applied 340 to the draped NCF 20 and cured 350 to form a contoured composite article. Applying 340 the polymer matrix to the NCF 20 can comprise impregnating the NCF 20 with polymer matrix in sufficient quantity to wet all of the fibers 22 thereof, for example. If the contoured article is tooling, method 300 can further comprise separating 360 the tooling from the contoured composite article.

The practice of the invention has been illustrated through reference to certain preferred embodiments that are intended to be exemplary and not limiting. The full scope of the invention is to be defined and limited only by the following claims.

The invention claimed is:

1. A method for forming a composite article, the method comprising:
providing a non-crimp fabric (NCF) comprising a plurality of fiber plies maintained in a layup by stitching, wherein the stitching exhibits a lower structural tolerance to heat and/or UV light relative to the fiber plies;
selectively reducing a thread strength or elasticity of the stitching in one or more predefined areas of the NCF using heat or UV light;
breaking the stitching with the reduced strength or elasticity in only the one or more predefined areas while leaving substantially intact the stitching in remaining regions of the NCF;
draping, subsequent to breaking the stitching, the NCF on a contoured article wherein, as a result of selectively breaking the stitching in the one or more predefined areas using heat or UV light, the NCF corresponds to topological features of the contoured article;
applying, subsequent to draping the NCF, a polymer matrix material to the draped NCF; and
curing the polymer matrix material to form a contoured composite article.

2. The method of claim 1, wherein the one or more predetermined areas of the NCF with the broken stitching, when the NCF is draped on the contoured article, align with the topological features of the contoured article.

3. The method of claim 2, wherein the topological features of the contoured article aligned with the broken stitches exhibit variation in more than one dimension.

4. The method of claim 1, wherein the fiber plies comprise carbon fibers, glass fibers, basalt fibers, or any combination thereof.

5. The method of claim 1, wherein the contoured article comprises tooling.

6. The method of claim 1, wherein the contoured article comprises an automotive component.

7. The method of claim 1, wherein the NCF comprises a bi-axial NCF.

8. A method for forming a composite article, the method comprising:
providing a non-crimp fabric (NCF) comprising a plurality of fiber plies maintained in a layup by stitching, wherein the stitching exhibits a lower structural tolerance to heat relative to the fiber plies;
selectively reducing a thread strength or elasticity of the stitching in one or more predefined areas of the NCF using heat;
breaking the stitching with the reduced strength or elasticity in only the one or more predefined areas while leaving substantially intact the stitching in remaining regions of the NCF;
draping, subsequent to breaking the stitching, the NCF on a contoured article wherein, as a result of selectively breaking the stitching in the one or more predefined areas using heat, the NCF corresponds to topological features of the contoured article; and
subsequently:
applying a polymer matrix material to the draped NCF; and
curing the polymer matrix material to form a contoured composite article.

9. The method of claim 8, wherein the fiber plies comprise carbon fibers, glass fibers, basalt fibers, or any combination thereof.

10. The method of claim 8, wherein the stitching comprises one or more polyamides, one or more polyesters, polyurethane, one or more rayon materials, polypropylene, one or more polyglycolic acids, one or more polyvinyl alcohols, or any combination thereof.

11. The method of claim 8, wherein the stitching is selectively broken by contacting the NCF with a heated contoured roller or a heated contoured stamp.

12. The method of claim 11, wherein the contoured roller or contoured stamp comprises contoured portions which are heated to at least a melting point of the stitching.

13. The method of claim 8, wherein the stitching is selectively broken by a laser, a rastered induction heating tool, or open-air plasma.

14. A method for forming a composite article, the method comprising:
providing a non-crimp fabric (NCF) comprising a plurality of fiber plies maintained in a layup by stitching, wherein the stitching exhibits a lower structural tolerance to UV light relative to the fiber plies;
selectively reducing a thread strength or elasticity of the stitching in one or more predefined areas of the NCF using heat;
breaking the stitching with the reduced strength or elasticity in only the one or more predefined areas while leaving substantially intact the stitching in remaining regions of the NCF; using UV light;

draping, subsequent to breaking the stitching, the NCF on a contoured article wherein, as a result of selectively breaking the stitching in the one or more predefined areas using UV light, the NCF corresponds to topological features of the contoured article; and subsequently:

applying a polymer matrix material to the draped NCF; and curing the polymer matrix material to form a contoured composite article.

15. The method of claim 14, wherein the stitching is selectively broken using UV light by applying a mask to the NCF, wherein the mask comprises one or more apertures which correspond to regions of the NCF in which stitching breaking is desired, and exposing the mask to UV light.

16. The method of claim 14, wherein the stitching is selectively broken by a shrouded UV light source.

17. The method of claim 14, wherein the fiber plies comprise carbon fibers, glass fibers, basalt fibers, or any combination thereof.

18. The method of claim 14, wherein the stitching comprises one or more polyamides, one or more polyesters, polyurethane, one or more rayon materials, polypropylene, one or more polyglycolic acids, one or more polyvinyl alcohols, or any combination thereof.

19. The method of claim 1, wherein the stitching is applied in a hybrid chain/tricot pattern.

20. The method of claim 1, wherein the stitching is formed from a polymeric material containing a filler, the filler including a plurality of metallic particles with an average diameter of about 10 nm to about 20 μm or a UV light additive configured to absorb UV light and degrade to generate organic free radicals.

* * * * *